(12) United States Patent
Chang

(10) Patent No.: US 9,271,593 B1
(45) Date of Patent: Mar. 1, 2016

(54) SUSPENSION DEVICE FOR SHOWER ROD

(71) Applicant: Shih-Kuo Chang, Tainan (TW)

(72) Inventor: Shih-Kuo Chang, Tainan (TW)

(*) Notice: Subject to any disclaimer, the term of this patent is extended or adjusted under 35 U.S.C. 154(b) by 0 days.

(21) Appl. No.: 14/735,206

(22) Filed: Jun. 10, 2015

(51) Int. Cl.
*A47H 1/14* (2006.01)
*A47H 1/142* (2006.01)
*A47K 3/38* (2006.01)
*F16B 11/00* (2006.01)

(52) U.S. Cl.
CPC *A47H 1/142* (2013.01); *A47K 3/38* (2013.01); *F16B 11/006* (2013.01)

(58) Field of Classification Search
CPC ......... A47H 1/142; A47K 3/38; F16B 11/006
USPC ................. 248/251, 254, 262, 264, 267, 268, 248/205.3, 105.1; 211/105.6, 105.1
See application file for complete search history.

(56) References Cited

U.S. PATENT DOCUMENTS

| | | | | |
|---|---|---|---|---|
| 4,700,918 A | * | 10/1987 | Andrasko, Jr. | A47K 3/001 211/105.1 |
| 9,107,529 B2 | * | 8/2015 | Didehvar | A47H 1/022 |
| 9,131,795 B2 | * | 9/2015 | Didehvar | A47H 1/022 |
| 2007/0169260 A1 | * | 7/2007 | Huang | A47K 3/38 4/558 |
| 2011/0113547 A1 | * | 5/2011 | O'Connell | A47K 3/38 4/608 |
| 2013/0292349 A1 | * | 11/2013 | Bucklew | A47H 1/022 211/105.2 |
| 2015/0096117 A1 | * | 4/2015 | Forrest | A47H 1/022 4/610 |

FOREIGN PATENT DOCUMENTS

CH    000549372 A1 *    5/1974    ............. A47H 1/142

* cited by examiner

*Primary Examiner* — Gwendolyn Baxter
(74) *Attorney, Agent, or Firm* — Alan D. Kamrath; Kamrath IP Lawfirm, P.A.

(57) ABSTRACT

A suspension device includes a sticking piece, a suspension seat, and a connecting head. The sticking piece has a back face coated with a hydrophilic adhesive. The suspension seat has a first shell connected with a front face of the sticking piece. The first shell has a slideway and two insertion plates. The connecting head has a mounting portion and a resting portion. The mounting portion has a mounting hole mounted on one end of a shower rod. The resting portion has a second shell provided with a protruding slide and two slots. The second shell is juxtaposed to the first shell, with the slide sliding into the slideway, and with the two insertion plates being inserted into the two slots, such that the connecting head is combined with the suspension seat.

5 Claims, 4 Drawing Sheets

SUSPENSION DEVICE FOR SHOWER ROD

BACKGROUND OF THE INVENTION

1. Field of the Invention

The present invention relates to a suspension device and, more particularly, to a suspension device for a shower rod of a shower curtain in a bathroom.

2. Description of the Related Art

A shower curtain is mounted in a bathroom to provide a covering function. The shower curtain is hung on a shower rod which is mounted between two walls. The shower rod has two opposite ends each provided with a suspension device affixed to the wall. A conventional suspension device includes a sucker attached to the wall. However, the sucker has a limited suction force so that the conventional suspension device easily slips from the wall and is easily detached from the wall so that the shower rod will fall down. Another conventional suspension device includes a plurality of screws screwed into the wall. However, it is necessary to drill bores in the wall for mounting the suspension device so that the wall is broken by the drilling action. In addition, the suspension device is affixed to the wall by the screws so that the position of the suspension device is fixed and cannot be adjusted any more.

BRIEF SUMMARY OF THE INVENTION

In accordance with the present invention, there is provided a suspension device comprising a sticking piece, a suspension seat, and a connecting head. The sticking piece has a front face and a back face opposite to the front face. The back face of the sticking piece is coated with a hydrophilic adhesive that becomes sticky after being wet and can be used repeatedly. The suspension seat has a first shell which has one end connected with the front face of the sticking piece. The first shell of the suspension seat has a top face having a slideway and two insertion plates. The slideway extends downward. The two insertion plates are distant from each other with a predetermined interval. The connecting head has a mounting portion and a resting portion coaxially connected with the mounting portion. The mounting portion has a free end having a mounting hole mounted on one end of a shower rod. The resting portion has a second shell which has a free end provided with a protruding slide. The second shell of the connecting head has a bottom face provided with two slots which extend upward and are distant from each other with a predetermined interval. The second shell of the connecting head is juxtaposed to the first shell of the suspension seat, with the slide of the connecting head sliding into the slideway of the suspension seat, and with the two insertion plates of the suspension seat being inserted into the two slots of the connecting head, such that the connecting head is combined with the suspension seat.

According to the primary advantage of the present invention, the sticking piece can be used repeatedly so that the suspension device can be reused.

According to another advantage of the present invention, the hydrophilic adhesive has a strong adhesive force so that the suspension device is attached to the wall solidly without slipping from the wall easily.

According to a further advantage of the present invention, the sticking piece is directly stuck to the wall without having to drill a bore in the wall so as to protect the wall and prevent the wall from being broken.

According to a further advantage of the present invention, the sticking piece is removed from and stuck to the wall reciprocally so that the position of the suspension device can be adjusted according to the user's requirement.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
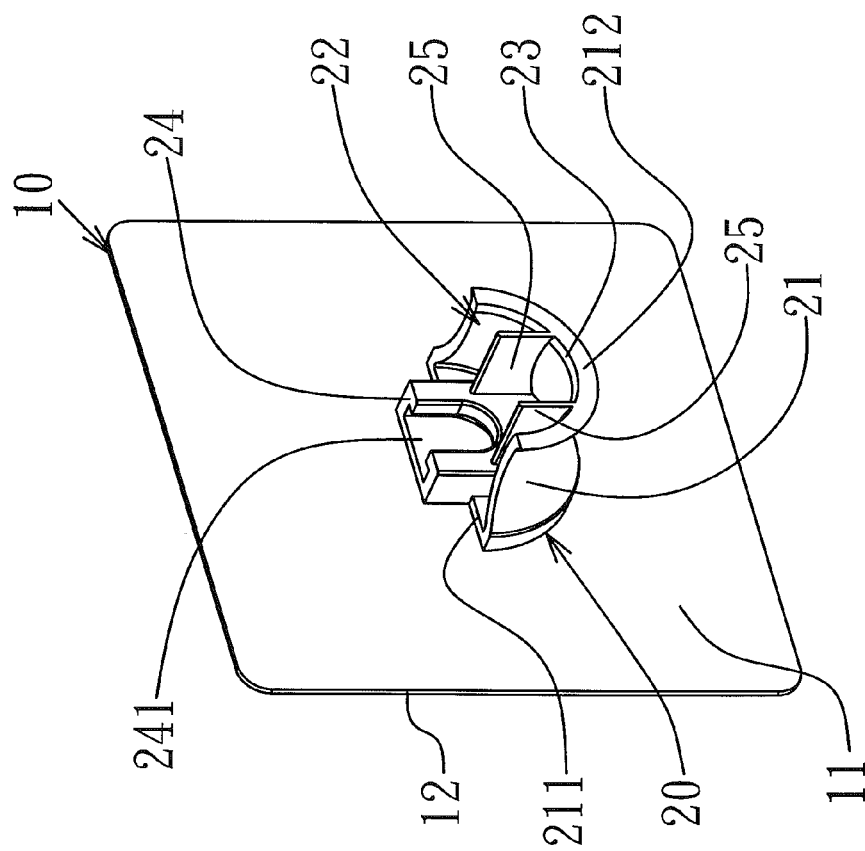
FIG. 1 is a partially perspective view of a suspension device in accordance with the preferred embodiment of the present invention.
Figure 2:
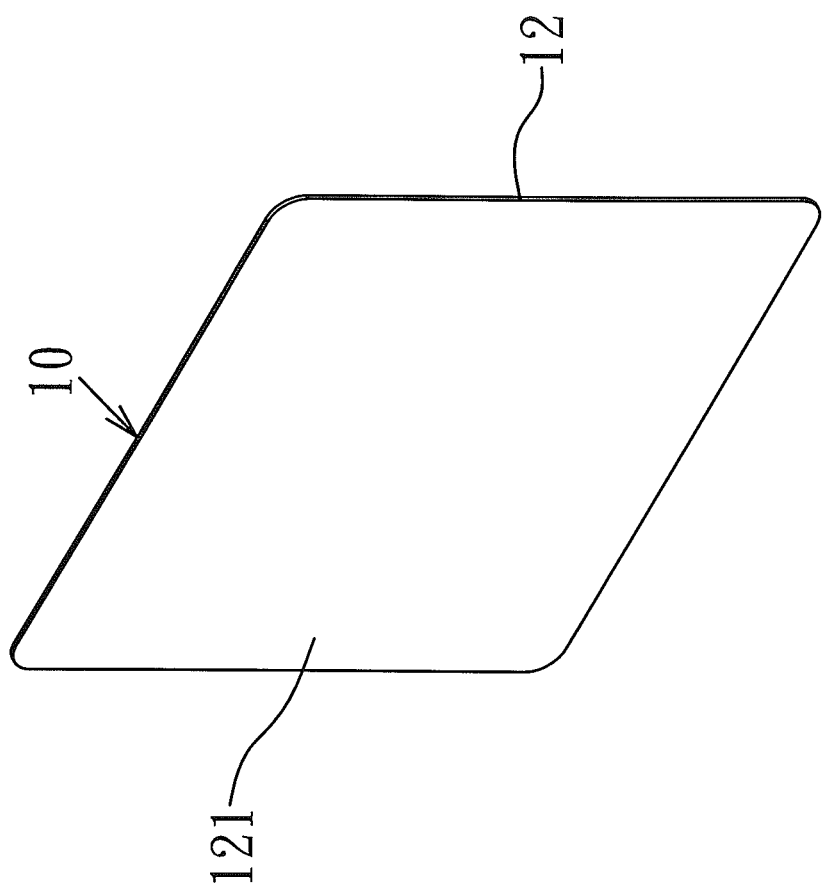
FIG. 2 is another perspective view of the suspension device as shown in FIG. 1.
Figure 3:
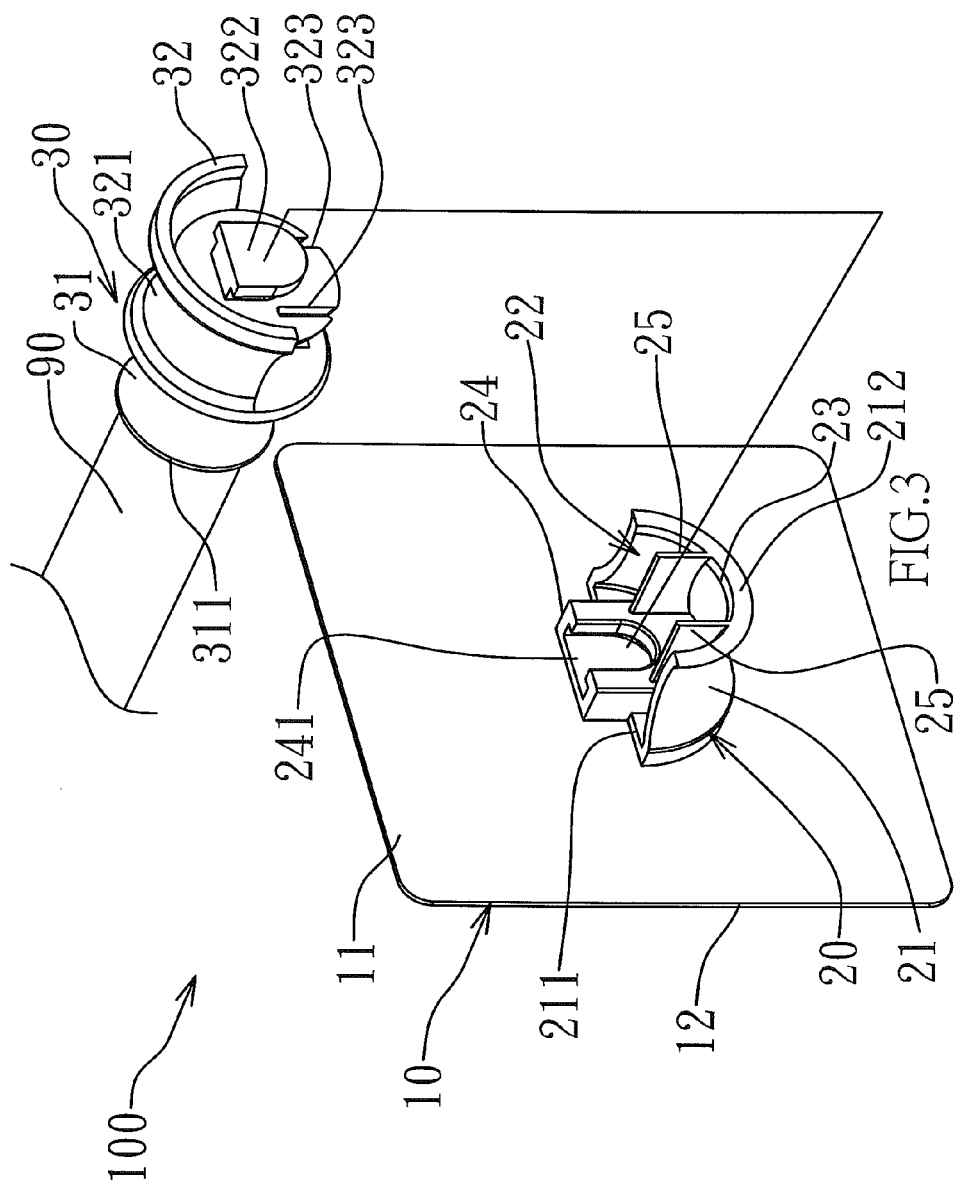
FIG. 3 is an exploded perspective view of the suspension device in accordance with the preferred embodiment of the present invention.

Referring to FIGS. 1-4, a suspension device 100 in accordance with the preferred embodiment of the present invention comprises a sticking piece 10, a suspension seat 20, and a connecting head 30.

The sticking piece 10 has a front face 11 and a back face 12 opposite to the front face 11. The back face 12 of the sticking piece 10 is coated with a hydrophilic adhesive 121 that becomes sticky after being wet and can be used repeatedly. The hydrophilic adhesive 121 has a strong adhesive feature after being wet and can be pulled and removed by a one-point force. The hydrophilic adhesive 121 has a conventional structure and will not be further described in detail. In the preferred embodiment of the present invention, the sticking piece 10 is made of soft material, including rubber or silicon gel.

The suspension seat 20 has a first shell 21 which has one end connected with the front face 11 of the sticking piece 10. The first shell 21 of the suspension seat 20 has a semi-circular shape and has a top face having a slideway 241 and two insertion plates 25. The slideway 241 extends downward. The two insertion plates 25 are distant from each other with a predetermined interval. The first shell 21 of the suspension seat 20 has an interior provided with a space 22 having a hollow top face. The first shell 21 of the suspension seat 20 has a first end provided with a connecting portion 211 connected with the front face 11 of the sticking piece 10 and a second end provided with an opened portion 212 opposite to the connecting portion 211. The opened portion 212 has an opening 23 connected to the space 22 to connect the space 22 to an ambient environment. The connecting portion 211 has a top face provided with a connecting bracket 24 protruding and extending upward, and the slideway 241 is formed in the connecting bracket 24 and extends downward. In the preferred embodiment of the present invention, the slideway 241 has a substantially T-shaped profile.

The connecting head 30 has a mounting portion 31 and a resting portion 32 coaxially connected with the mounting portion 31. The mounting portion 31 has a free end having a mounting hole 311 mounted on one end of a shower rod 90. The resting portion 32 has a second shell 321 which has a free end provided with a protruding slide 322. In the preferred embodiment of the present invention, the slide 322 has a substantially T-shaped profile. The second shell 321 of the connecting head 30 has a semi-circular shape and has a bottom face provided with two slots 323 which extend upward and are distant from each other with a predetermined interval. The second shell 321 of the connecting head 30 is juxtaposed to the first shell 21 of the suspension seat 20, so that the slide 322 of the connecting head 30 slides into the slideway 241 of the suspension seat 20, and the two insertion plates 25 of the suspension seat 20 are inserted into the two slots 323 of the connecting head 30, such that the connecting head 30 is combined with the suspension seat 20.

Figure 4:
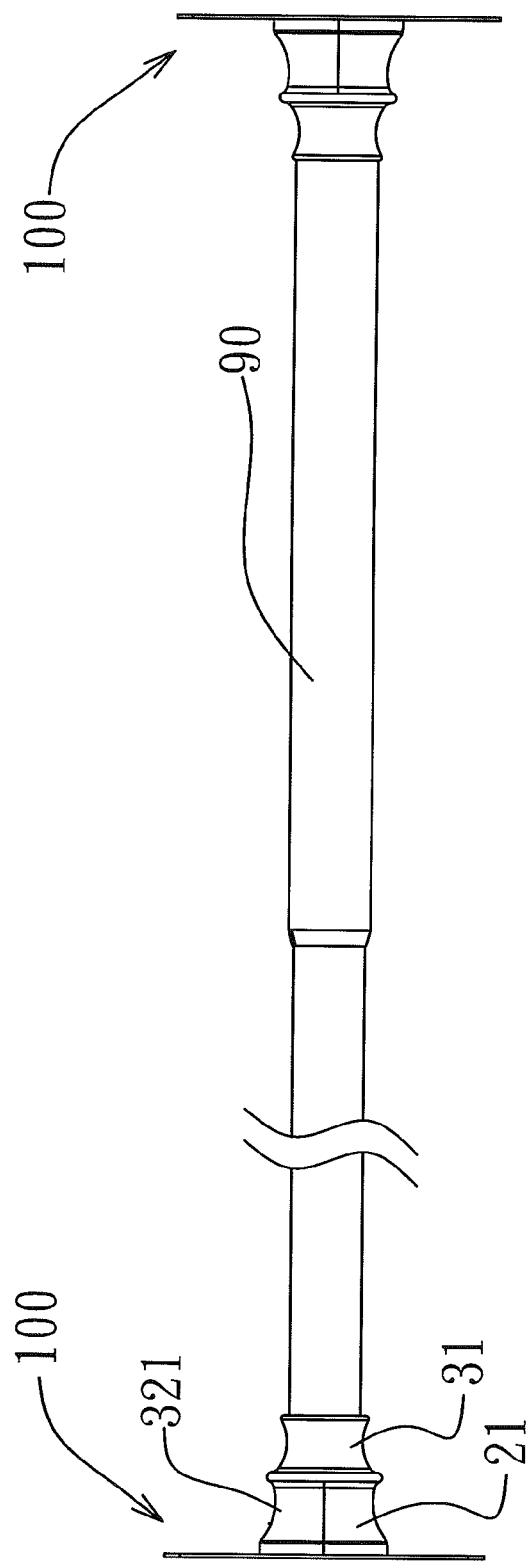
FIG. 4 is a schematic front assembly view of the suspension device in accordance with the preferred embodiment of the present invention.

In assembly, referring to FIG. 4 with reference to FIG. 10, the hydrophilic adhesive 121 is initially wet by water so that the hydrophilic adhesive 121 becomes sticky. Then, the hydrophilic adhesive 121 is stuck to a wall to attach the sticking piece 10 to the wall. Then, one end of the shower rod 90 is inserted into the mounting hole 311 of the connecting head 30. Then, the slide 322 of the connecting head 30 slides into the slideway 241 of the suspension seat 20, and the two insertion plates 25 of the suspension seat 20 are inserted into the two slots 323 of the connecting head 30, so that the connecting head 30 is combined with the suspension seat 20 solidly and stably. At this time, the second shell 321 of the connecting head 30 is juxtaposed to the first shell 21 of the suspension seat 20, so that the first shell 21 of the suspension seat 20 and the second shell 321 of the connecting head 30 construct a cylindrical configuration. Thus, the shower rod 90 is supported and suspended by the suspension device 100 for hanging a shower curtain (not shown).

When the user wishes to adjust the position of the shower rod 90, the user only needs to slightly apply a force to detach the slide 322 of the connecting head 30 from the slideway 241 of the suspension seat 20, and to detach the two insertion plates 25 of the suspension seat 20 from the two slots 323 of the connecting head 30, so that the connecting head 30 is separated from the suspension seat 20. Then, the user concentrates the force on one point of the sticking piece 10 to remove the sticking piece 10 from the wall. Then, the hydrophilic adhesive 121 is wet again by water so that the hydrophilic adhesive 121 becomes sticky. Thus, the sticking piece. 10 is attached to a required position of the wall. Then, the connecting head 30 is combined with the suspension seat 20 to assemble the suspension device 100 for supporting the shower rod 90 at the required position of the wall.

Accordingly, the sticking piece 10 can be used repeatedly so that the suspension device 100 can be reused. In addition, the hydrophilic adhesive 121 has a strong adhesive force so that the suspension device 100 is attached to the wall solidly without slipping from the wall easily. Further, the sticking piece 10 is directly stuck to the wall without having to drill a bore in the wall so as to protect the wall and prevent the wall from being broken. Further, the sticking piece 10 is removed from and stuck to the wall reciprocally so that the position of the suspension device 100 can be adjusted according to the user's requirement.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A suspension device comprising:
a sticking piece, a suspension seat, and a connecting head; wherein:
the sticking piece has a front face and a back face opposite to the front face;
the back face of the sticking piece is coated with a hydrophilic adhesive that becomes sticky after being wet and can be used repeatedly;
the suspension seat has a first shell which has one end connected with the front face of the sticking piece;
the first shell of the suspension seat has a top face having a slideway and two insertion plates;
the slideway extends downward;
the two insertion plates are distant from each other with a predetermined interval;
the connecting head has a mounting portion and a resting portion coaxially connected with the mounting portion;
the mounting portion has a free end having a mounting hole mounted on one end of a shower rod;
the resting portion has a second shell which has a free end provided with a protruding slide;
the second shell of the connecting head has a bottom face provided with two slots which extend upward and are distant from each other with a predetermined interval; and
the second shell of the connecting head is juxtaposed to the first shell of the suspension seat, with the slide of the connecting head sliding into the slideway of the suspension seat, and with the two insertion plates of the suspension seat being inserted into the two slots of the connecting head, such that the connecting head is combined with the suspension seat.

2. The suspension device of claim 1, wherein the sticking piece is made of soft material, including rubber or silicon gel.

3. The suspension device of claim 1, wherein:
the first shell of the suspension seat has a semi-circular shape; and
the second shell of the connecting head has a semi-circular shape.

4. The suspension device of claim 1, wherein:
the first shell of the suspension seat has an interior provided with a space having a hollow top face;
the first shell of the suspension seat has a first end provided with a connecting portion connected with the front face of the sticking piece and a second end provided with an opened portion opposite to the connecting portion;
the opened portion has an opening connected to the space to connect the space to an ambient environment;
the connecting portion has a top face provided with a connecting bracket protruding and extending upward; and
the slideway is formed in the connecting bracket and extends downward.

5. The suspension device of claim 1, wherein:
the slideway has a substantially T-shaped profile; and
the slide has a substantially T-shaped profile.

* * * * *